United States Patent
Goose et al.

(10) Patent No.: US 8,984,330 B2
(45) Date of Patent: Mar. 17, 2015

(54) FAULT-TOLERANT REPLICATION ARCHITECTURE

(75) Inventors: Stuart Goose, Berkeley, CA (US); Jonathan Kirsch, Menlo Park, CA (US)

(73) Assignee: Siemens Corporation, Iselin, NJ (US)

( * ) Notice: Subject to any disclaimer, the term of this patent is extended or adjusted under 35 U.S.C. 154(b) by 336 days.

(21) Appl. No.: 13/432,084

(22) Filed: Mar. 28, 2012

(65) Prior Publication Data

US 2013/0036323 A1 Feb. 7, 2013

Related U.S. Application Data

(60) Provisional application No. 61/468,129, filed on Mar. 28, 2011.

(51) Int. Cl.
*G06F 11/00* (2006.01)
*G06F 11/20* (2006.01)
*G06F 11/14* (2006.01)

(52) U.S. Cl.
CPC ........ *G06F 11/2038* (2013.01); *G06F 11/1484* (2013.01); *G06F 11/2028* (2013.01); *G06F 11/2041* (2013.01); *G06F 11/2048* (2013.01)

USPC .................................. 714/4.11; 714/4.1; 714/2

(58) Field of Classification Search
USPC ............................................ 714/4.11, 10, 11
See application file for complete search history.

(56) References Cited

U.S. PATENT DOCUMENTS

| | | | |
|---|---|---|---|
| 2010/0017644 A1* | 1/2010 | Butterworth | 714/4 |
| 2010/0275058 A1* | 10/2010 | Hashimoto et al. | 714/8 |
| 2011/0321041 A1* | 12/2011 | Bhat et al. | 718/1 |

* cited by examiner

*Primary Examiner* — Sarai Butler (57) ABSTRACT

A fault-tolerant replication system includes a first machine running a first hypervisor. A second machine is failure-independent of the first machine. The second machine runs a second hypervisor. A first plurality of virtual machines runs on the first hypervisor. A second plurality of virtual machines runs on the second hypervisor. Each of the virtual machines of the first and second plurality of virtual machines constitutes either a virtual machine replica server of a fault-tolerant replicated state machine or a backup corresponding to a virtual machine replica server of the fault-tolerant replicated state machine. Every backup is embodied on a different machine, of the first and second machines, from its corresponding virtual machine replica server.

23 Claims, 6 Drawing Sheets

Backups

FAULT-TOLERANT REPLICATION ARCHITECTURE

CROSS-REFERENCE TO RELATED APPLICATION

The present application is based on provisional application Ser. No. 61/468,129, filed Mar. 28, 2011, the entire contents of which are herein incorporated by reference.

TECHNICAL FIELD

The present disclosure relates to replication architecture and, more specifically, to fault-tolerant replication architecture.

DISCUSSION OF THE RELATED ART

Traditionally, a single application for providing a service may be executed on a single computer system. However, as such a configuration is vulnerable to a single point of failure, several approaches have been developed for creating a more robust architecture. In one such approach, known as failover, the application may be executed on a primary computer system while a redundant or backup computer system stands ready to assume the function of the primary computer system in the event of failure.

Another approach for creating a more robust architecture is known as state machine replication. In state machine replication, any number of servers, known as replica servers, may execute the application to provide the service. By communicating through a series of messages, the replica servers may elect a single replica server to act as a leader and the leader may function, along with the non-leader replica servers, to maintain an order in which client requests are processed so that all properly functioning replica servers maintain a common state.

State machine replication may have the ability to tolerate benign failures. A benign failure is when a particular replica server loses its ability to contribute to the progress of the application. State machine replication that is tolerant to benign failures may require at least 2f+1 where f represents the number of replica servers that may simultaneously be subject to benign failure without causing the application to stop making progress replica servers, f+1 of which may have to remain functioning in order to make progress.

State machine replication may also have the ability to tolerate Byzantine failures. Unlike a conventional failure which may render the affected replica server inoperable, a Byzantine failure may cause the replica server to provide spurious output. The spurious output may cause confusion among the remaining replica servers and may cause progress of the application to stop. State machine replication that is tolerant to Byzantine failures may require at least 3f+1 replica servers where f represents the number of replica servers that may simultaneously be subject to Byzantine failure without causing the application to stop making progress, 2f+1 of which may have to remain functioning in order to make progress. Accordingly, in many Byzantine fault-tolerant state machine replication systems, at least four replica servers may be required.

While state machine replication may provide a greater level of fault tolerance than failover, the need to maintain at least four computer systems may be cost prohibitive for many providers.

SUMMARY

A fault-tolerant replication system includes a first machine running a first hypervisor. A second machine is failure-independent of the first machine. The second machine runs a second hypervisor. A first storage device is within or in communication with the first machine. The first storage device stores code representing a first plurality of virtual machines. A second storage device is within or in communication with the second machine. The second storage device stores code representing a second plurality of virtual machines. Each of the virtual machines of the first and second plurality of virtual machines constitutes either a virtual machine replica server of a fault-tolerant replicated state machine or a backup corresponding to a virtual machine replica server of the fault-tolerant replicated state machine. Every backup is embodied on a different machine, of the first and second machines, from its corresponding virtual machine replica server.

The first and second failure-independent machines may be distinct physical machines or they may be implemented on distinct physical machines. The first and second failure-independent machines may be implemented on failure-independent virtual machines running on a common physical machine. The fault-tolerant replication system may be a Byzantine fault-tolerant replication system.

All of the virtual machine replica servers of the fault-tolerant replicated state machine may be located on the first machine and may be run by the first hypervisor and all of the backups may be located on the second machine and may be run by the second hypervisor.

The virtual machine replica servers of the fault-tolerant replicated state machine may include a first subgroup of one or more virtual machine replica servers and a second subgroup of virtual machine replica servers having a corresponding first subgroup of backups and a second subgroup of backups. All of the virtual machine replica servers of the first subgroup may be located on the first machine and may be run by the first hypervisor and all of the backups of the first subgroup may be located on the second machine and may be run by the second hypervisor. All of the virtual machine replica servers of the second subgroup may be located on the second machine and may be run by the second hypervisor and all of the backups of the second subgroup may be located on the first machine and may be run by the first hypervisor.

Each backup corresponding to a virtual machine replica server of the fault-tolerant replicated state machine may be a failover virtual machine for its corresponding virtual machine replica server.

The fault-tolerant replicated state machine may provide a service which is accessible by one or more clients over an electronic network. The electronic network may be the Internet.

The first hypervisor may include a function for permitting one of the virtual machines of the first plurality of virtual machines to determine a unique identifier associated with the first hypervisor. The second hypervisor may include a function for permitting one of the virtual machines of the second plurality of virtual machines to determine a unique identifier associated with the second hypervisor.

The first and second hypervisors may each include a function for permitting any one of the virtual machine replica servers to inform the respective hypervisor of a current leader among the virtual machine replica servers of the fault-tolerant replicated state machine.

The first and second hypervisors may each include a function for permitting any one of the virtual machine replica servers to inform the respective hypervisor of a virtual machine among the virtual machine replica servers of the fault-tolerant replicated state machine that is to be restarted first after recovery from a failure of either the first or second machines.

A method for providing a fault-tolerant replication system includes installing a first hypervisor on a first machine. A second hypervisor is installed on a second machine. The second machine is failure-independent of the first machine. A plurality of virtual machine replica servers runs on the first and second hypervisors of the first and second machines. The plurality of virtual machine replica servers includes a fault-tolerant replicated state machine. A plurality of backup virtual machines corresponding to the plurality of virtual machine replica servers is established. Each backup virtual machine of the plurality of backup virtual machines is embodied on a different machine, of the first and second machines, from its corresponding virtual machine replica server.

The first and second failure-independent machines may be distinct physical machines or may be implemented in distinct physical machines. The first and second failure-independent machines may be implemented on failure-independent virtual machines running on a common physical machine. The fault-tolerant replication system may be a Byzantine fault-tolerant replication system. Each of the virtual machine replica servers may be embodied on the first machine and may be run by the first hypervisor and each of the backups maybe embodied on the second machine and may be run by the second hypervisor.

The plurality of virtual machine replica servers may be divided into a first subgroup and a second subgroup and each of the virtual machine replica servers of the first subgroup may be embodied on the first machine and may be run by the first hypervisor. Each of the virtual machine replica servers of the second subgroup may be embodied on the second machine and may be run by the second hypervisor. Each of the backups corresponding to the virtual machine replica servers of the first subgroup may be embodied in the second machine and may be run by the second hypervisor. Each of the backups corresponding to the virtual machine replica servers of the second subgroup may be embodied in the first machine and may be run by the first hypervisor.

Each backup corresponding to a virtual machine replica server may be a failover virtual machine for its corresponding virtual machine replica server. When one of the first and second machines fails, all of the backups established on the surviving machine may assume the function of their corresponding virtual machine replica servers that were running on the failed machine.

A particular virtual machine replica server of the plurality of virtual machine replica servers may determine an identity of the hypervisor it is running on. After the identified machine fails and a particular backup corresponding to the particular virtual machine replica server assumes a function of the particular virtual machine replica server, the particular backup may determine an identity of the hypervisor it is running on, determine that the identified machine has failed based on a mismatch between the identity of the hypervisor determined by the particular virtual machine replica server and the identity of the hypervisor determined by the backup, and extend criteria for determining a failure of a virtual machine replica server based on the determination that the identified machine has failed.

One or more of the virtual machine replica servers of the plurality of virtual machine replica servers may inform their respective hypervisors of an identity of a current leader among the plurality of virtual machine replica servers. After a machine of the first and second machines fails and backups corresponding to the virtual machine replica servers that were running on the failed machine assume operation of their respective virtual machine replica servers, a backup of the backups corresponding to the virtual machine replica servers that were running on the failed machine corresponding with a virtual machine replica server that was identified as the current leader may be started before the remainder of backups.

A Byzantine fault-tolerant replication system includes a first physical machine running a first hypervisor. A second physical machine, distinct from the first physical machine, runs a second hypervisor. A plurality of virtual machine replica servers of a Byzantine fault-tolerant replicated state machine run on the first hypervisor. A plurality of virtual machine backups run on the second hypervisor. Each of the plurality of virtual machine backups corresponds to one of the virtual machine replica servers of the plurality of virtual machine replica servers.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention may provide an architecture and associated distributed algorithms for running a fault-tolerant state machine replication system in which the number of required physical machines is reduced and an amount of time required to recover from a failed machine is minimized.

Exemplary embodiments of the present invention may be implemented on as few as two independent physical computer machines and an application running thereon may continue to make progress even in the event that one of the two machines experiences a failure. According to some exemplary embodiments of the present invention, the fault-tolerant state machine replication system may be tolerant of Byzantine failures while according to other exemplary embodiments of the present invention, the fault-tolerant state machine replication system may only be tolerant of benign failures in which no spurious output is produced from a failed replica server. The two physical machines may together host a Byzantine fault-tolerant state machine replication system having four or more replica servers running thereon or the two physical machines may together host a benign fault-tolerant state machine replication system having three or more replica servers running thereon.

This may be achieved, for example, by embodying each of the replica servers as a virtual machine on one of the two physical machines. Each of the two physical machines may execute a thin virtualization layer or hypervisor for hosting one or more virtual machines.

According to exemplary embodiments of the present invention, each of the virtual machine replica servers may execute on either one of the two physical machines. For example, one virtual machine replica server may execute on a first physical machine while the remaining three virtual machine replica servers execute on a second physical machine; two virtual machine replica servers may run on each physical machine; or all virtual machine replica servers may run on the same physical machine.

Each virtual machine replica server may have a corresponding backup replica server hat is also virtualized. The backup may act as a failover for the corresponding virtual machine replica server. The backup may be maintained in lockstep with its corresponding primary replica server and may take over responsibilities for the primary replica server when the primary replica server experiences a failure. Maintenance of the backup and the transfer of responsibilities from the primary to the backup may be implemented, for example, using a failover feature of the particular hypervisor being used. For example, VMWARE FAULT TOLERANCE is a featured offered by VMWARE, INC. for the VMWARE hypervisor and REMUS HIGH AVAILABILITY is a feature offered by THE XEN PROJECT, XENSOURCE, INC. for the XEN hypervisor. However, exemplary embodiments of the present invention are not limited to one of these listed features or one of these listed hypervisors and other hypervisors and other failover approaches may be used.

Regardless of the manner of configuration used, the virtual machine backup replica server may be placed on a separate physical machine from its corresponding virtual machine replica server. Accordingly, in the event that one of the two physical machines were to sustain a failure, the virtual machine backup replica servers corresponding to the virtual machine replica servers that were running on the failed physical machine would be brought up and running on the surviving functional physical machine where they would be located.

However, more generally, exemplary embodiments of the present invention need not utilize separate physical machines for the virtual machine replica servers and the backup thereof. It may be sufficient that the two machines be failure-independent of one another. In this context, "failure-independent" may be understood to mean that the failure of one machine does not necessarily imply that the other machine will also fail and vice versa. Thus if a machine 1 and a machine 2 are failure-independent, it is at least possible for machine 2 to continue to function properly even upon the failure of machine 1 and it is also at least possible for machine 2 to continue to function properly even upon the failure of machine 1.

Moreover, in this context, the word "machine" is not limited to being a physical machine. A "machine" may also be a virtual machine that runs on a physical machine.

As discussed above, the virtual machine replica server and its backup may be implemented on failure-independent machines. According to some exemplary embodiments of the present invention, these failure-independent machines may be embodied as virtual machines running on a common physical machine as long as the immediate ancestor hypervisor of one virtual machine is not also an ancestor of the other virtual machine. This is because if the immediate ancestor hypervisor of a first virtual machine is also an ancestor of a second virtual machine, then the failure of the first virtual machine due to platform crash implies the failure of the immediate ancestor of the first virtual machine and that necessarily implies the failure of the second virtual machine. Accordingly, the first and second virtual machines are not failure-independent.

Figure 1:
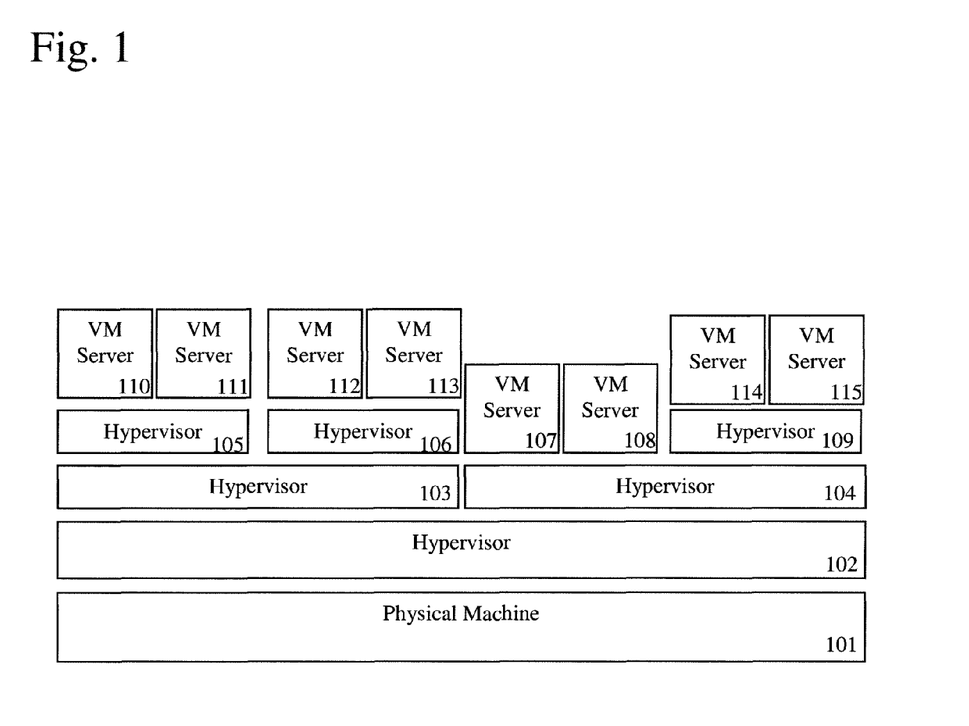
FIG. 1 is a block diagram illustrating failure independence along a virtual machine tree hierarchy according to exemplary embodiments of the present invention.

FIG. 1 is a block diagram illustrating failure-independence along a virtual machine tree hierarchy according to exemplary embodiments of the present invention. As may be seen from FIG. 1, a single physical machine 101 may run a hypervisor 102. The hypervisor 102 may itself run two hypervisors 103 and 104, for example, as virtual machines. The hypervisor 103 may itself run two hypervisors 105 and 106, for example, as virtual machines. The hypervisor 104 may itself run a hypervisor 109 and two virtual machine servers 107 and 108, for example, as virtual machines. The hypervisor 105 may itself run two virtual machine servers 110 and 111, for example, as virtual machines. The hypervisor 106 may itself run two virtual machine servers 112 and 113, for example, as virtual machines. The hypervisor 109 may itself run two virtual machine servers 114 and 115, for example, as virtual machines. Under this exemplary hierarchical relationship, virtual machine server 110 and virtual machine server 112 are failure-independent because the immediate hypervisor ancestor 105 of virtual machine server 110 is not an ancestor to virtual machine server 112, and the immediate hypervisor ancestor 106 of virtual machine server 112 is not an ancestor to virtual machine server 110. Thus because virtual machine servers 110 and 112 are failure independent, they may be used as a virtual machine replica server and a backup pair.

However, virtual machine server 107 and virtual machine server 114 are not failure independent because the immediate hypervisor ancestor 104 of virtual machine server 107 is also an ancestor to virtual machine server 114, if virtual machine server 107 fails due to a platform crash, then hypervisor 104 has failed as well and accordingly, virtual machine server 114 has also failed. Thus virtual machine server 107 and virtual machine server 114 are not suitable for use as a virtual machine replica server and backup pair.

Accordingly, while exemplary embodiments of the present invention may be applied to any failure-independent machines, distinct physical machines are discussed below and illustrated in the figures as simple examples of failure-independent machines.

Figure 2:
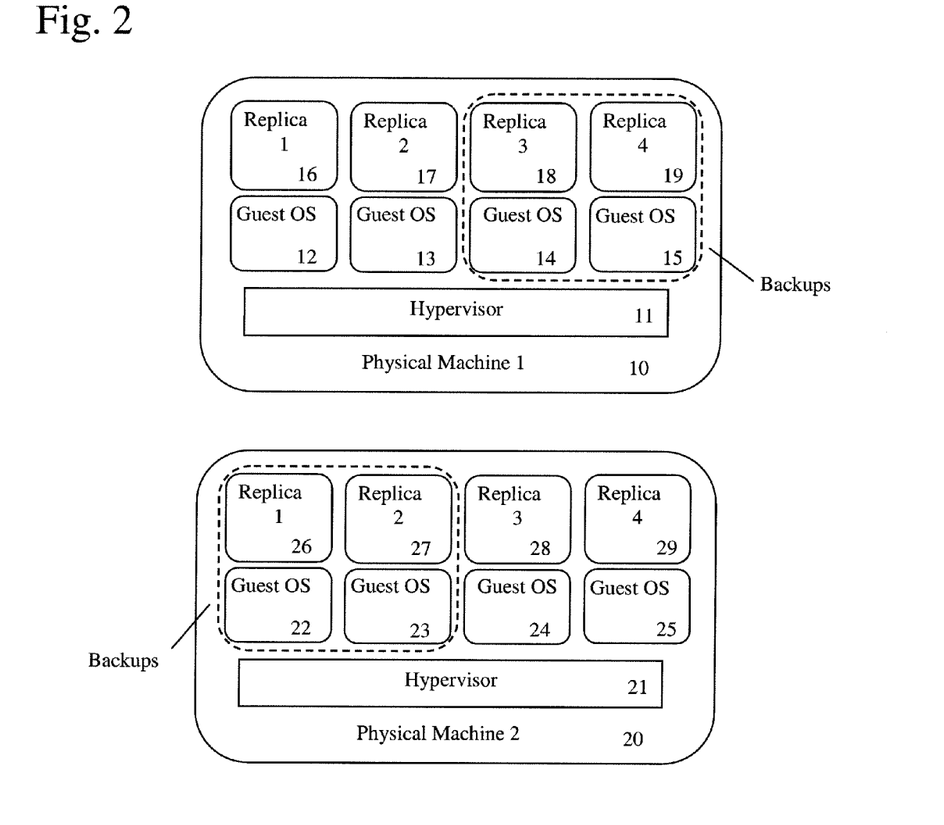
FIG. 2 is a block diagram illustrating an architecture for fault-tolerant replication according to an exemplary embodiment of the present invention.

FIG. 2 is a block diagram illustrating an architecture for fault-tolerant replication according to an exemplary embodiment of the present invention. The fault-tolerant replication system may be Byzantine fault-tolerant or alternatively, it may be simply tolerant of benign failure. As may be seen, there are two physical machines: a first physical machine 10 and a second physical machine 20. Each physical machine may be embodied as an independent computer system. A first hypervisor 11 may be present and running on the first physical machine 10 while a second hypervisor 21 may be present and running on the second physical machine 20. The first and second hypervisors 11 and 21 may be the same type of hypervisor and may be, for example, VMWARE or XEN, as mentioned above, or any other hypervisor made available either commercially or freely. Each hypervisor 11 and 21 may run, for example, four virtual machine replica servers each with its own guest operating system. For example, the first hypervisor 11 on the first physical machine 10 may run a first virtual machine replica server 16 over a first guest OS 12, a second virtual machine replica server 17 over a second guest OS 13, a third virtual machine replica server 18 over a third guest OS 14, and a fourth virtual machine replica server 19 over a fourth guest OS 15.

Similarly, the second hypervisor 21 on the second physical machine 20 may run a first virtual machine replica server 26 over a first guest OS 22, a second virtual machine replica server 27 over a second guest OS 23, a third virtual machine replica server 28 over a third guest OS 24, and a fourth virtual machine replica server 29 over a fourth guest OS 25.

According to the exemplary embodiment of the present invention depicted in FIG. 2, the third virtual machine replica server 18 of the first physical machine 10 may be a backup for the third virtual machine replica server 8 of the second physical machine 20 and the fourth virtual machine replica server 19 of the first physical machine 10 may be a backup for the fourth virtual machine replica sever 29 of the second physical machine 20. Similarly, the first virtual machine replica server 26 of the second physical machine 20 may be a backup for the first virtual machine replica server 16 of the first physical machine 10 and the second virtual machine replica server 27 of the second physical machine 20 may be a backup for the second virtual machine replica server 16 of the first physical machine 10. Thus, in the depicted configuration, each physical machine may host two primary virtual machine replica servers and two backups. Each of the backups may be, for example, a failover managed by the hypervisor such as VMWARE FAULT TOLERANCE or REMUS HIGH AVAILABILITY.

Under such a configuration, if one of the primary virtual machine replica servers fails, the other primary virtual machine replica servers may carry on normal operation within the failed virtual machine replica server, in some cases, even in the event that the failed virtual machine replica server experiences a Byzantine failure. Additionally, if one of the physical machines were to fail thereby taking out two primary virtual machine replica servers, then the corresponding backups for those two primary virtual machine replica servers, which are located on the surviving physical machine, would seamlessly take over responsibility for the corresponding two primary virtual machine replica servers which were running on the failed physical machine.

It should be understood that exemplary embodiments of the present invention are not limited to two primary virtual machine replica servers and two backups running on each of the two physical machines. Any configuration in which a primary virtual machine replica server and its corresponding backup are located on distinct physical machines may be used.

Moreover, once operation of the failed physical machine is restored, backups for the primary virtual machine replica servers may be run on the restored physical machine. Primary virtual machine replica servers may also be moved from the surviving physical machine to the restored physical machine to re-form the original configuration, for example, the configuration shown on FIG. 2.

The architecture described above may be used in conjunction with any Byzantine or benign fault-tolerant state machine replication protocol. However, exemplary embodiments of the present invention may utilize various techniques for minimizing the time required for the protocols to recover following a failure of one of the physical machines. By minimizing the recovery time, applications may be brought back on line faster and with less operational interruption. This may be particularly valuable when the applications are real-time and/or safety-critical in nature.

The fault-tolerant state machine replication protocol use in conjunction with exemplary embodiments of the present invention may be coordinated by a dynamically-elected leader replica that may be selected from among the set of 3f+1 replicas, as may be seen in the case of Byzantine fault-tolerant systems. Each replica may be assigned a unique identifier ranging from 1 to 3f+1. The non-leader replicas may monitor the performance of the current leader and vote to elect a new leader if the current leader is suspected to be faulty. The next leader may then be selected as the replica with the next highest identifier with respect to the current leader. Where the current leader has the highest identifier, the next leader may be selected as the replica with the lowest identifier. The leader election protocol used to elect the new leader may require the participation of some predetermined number of functioning replicas. For example, the participation of 2f+1 functioning replicas may be required to ensure that the system will make progress under the reign of the new leader.

The non-leaders may monitor the performance of the leader by measuring the time between two protocol events. For example, the non-leader might record the time at which it sends a message to the leader and the time at which it receives the leader's response. This roundtrip time may then be used by a decision function to determine if the non-leader should suspect the leader of being faulty. If the leader is suspected of being faulty then the non-leader may elect to replace the leader.

Exemplary embodiments of the present invention seek to minimize the time needed to recover from a failure (the "recovery time"). As described herein, there are two types of recovery times. Virtualization recovery time (VRT) is defined as the time between when the primary virtual machine replica servers on the failed physical machine stop working and when the backup replicas on the other physical machine assume control for their corresponding failed primaries. This time may be dependent upon the fault tolerance synchronization protocol implemented by the hypervisors.

Replication protocol recovery time (RPRT) is defined as the time between when the backup replicas assume control for their failed primaries and when the replicas finish electing a new leader. Exemplary embodiments of the present invention may assume that on a crash of a physical machine, if the surviving physical machine contains fewer than, for example in the case of a Byzantine-fault-tolerant replication system, three primary replicas before the crash then the total recovery time may be at least equal to the VRT. This is because at least one backup replica must assume control, on the surviving physical machine, for its failed primary before progress can resume. Additionally, if all primary replicas are on the surviving physical machine before the crash, then VRT=0. In this event, the application would not be impacted by the crash. Moreover, if the current leader is not suspected of being faulty after the crash then RPRT=0.

Figure 3:
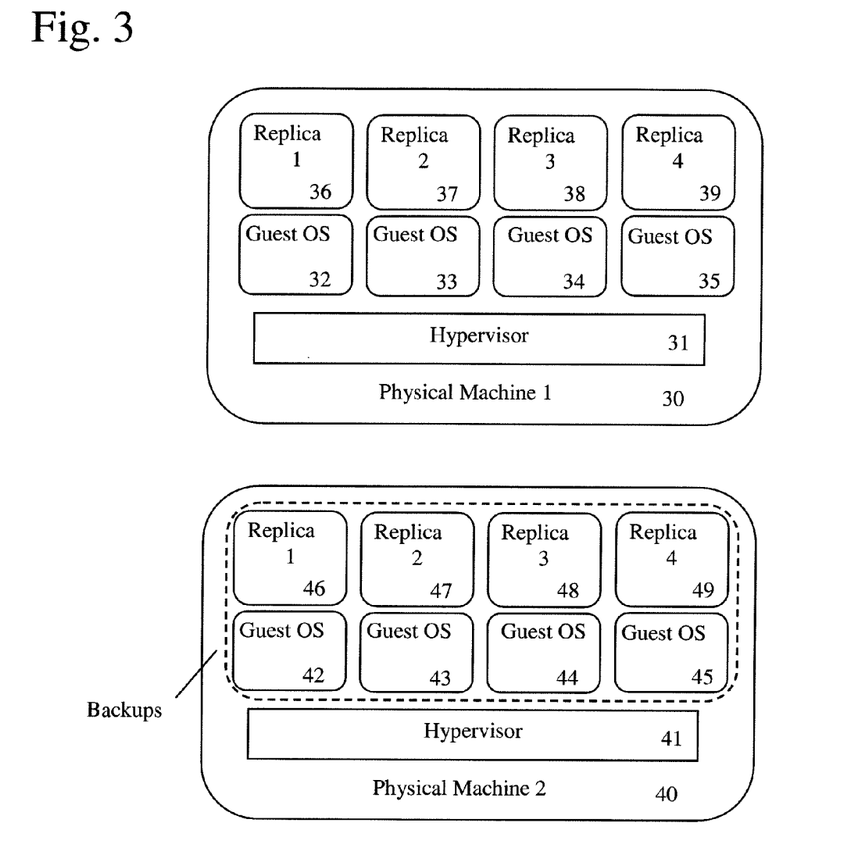
FIG. 3 is a block diagram illustrating an optimized architecture for fault-tolerant replication according to an exemplary embodiment of the present invention.

In light of the above assumptions, exemplary embodiments of the present invention may utilize an optimized system architecture. FIG. 3 is a block diagram illustrating an optimized architecture for fault-tolerant replication according to an exemplary embodiment of the present invention. The fault-tolerant replication may be, for example, Byzantine fault-tolerant, or alternatively, it may be simply tolerant of benign failure. Here, the first physical machine 30 hosts all of the primary virtual machine replica servers 36-39 over corresponding guest operating systems 32-35 through the hypervisor 31. The second physical machine 40 then hosts all of the backup virtual machine replica servers 46-49 over corresponding guest operating systems 42-45 through the hypervisor 41.

Under such a configuration, a crash of the second physical machine 40 would have no effect on application performance, which is to say, VRT=RPRT=0. However, when the first physical machine 30 crashes the recovery time is dependent upon both VRT and RPRT. The crashing of the physical machine does not imply that the leader server replica is itself faulty. However, as the time taken to restore the virtual machine replica servers from the backups may prolong the period of time taken to receive a response from a leader, it is possible that the non-leaders may interpret this extended time as a failure of the leader itself rather than a restoration of a failure of a physical machine. Moreover, if the non-leaders are restored prior to the restoration of the leader, the problem may be exacerbated. Accordingly, RPRT may be minimized by ensuring that upon activation of the backup virtual machine replica servers 46-49 on the second physical machine 40, the non-leader replica servers wait an appropriate length of time prior to suspecting that the leader is faulty.

Accordingly, exemplary embodiments of the present invention provide a mechanism to make the virtual machine replica servers aware of the occurrence of a restoration from backup. As failover systems such as VMWARE FAULT TOLERANCE or REMUS HIGH AVAILABILITY may be intentionally designed to make the restoration process invisible, exemplary embodiments of the present invention provide a means for a virtual machine replica server to become aware of the fact that it is being run from a backup. Upon being made aware of the occurrence of the restoration from backup, the non-leaders may provide additional time for the leader to generate events that may be used by the non-leaders to measure leader response time, before the non-leaders initiate election of a new leader. This additional time may, for example, be equal to an approximated or average time required to recover from a fail-over, e.g., the VRT.

One approach for making the virtual machine replica servers aware of the occurrence of a restoration from backup, according to exemplary embodiments of the present invention, is to provide the ability for the virtual machine replica servers to determine the hypervisor that they are running on. This ability may then be used to identify a change in hypervisor, which in some cases, may be analogous to identifying a change in physical machine. This ability for the virtual machine replica server to know which hypervisor it is running on, and in some cases, to know which physical machine it is running on, is a departure from existing implementations of virtual machine hypervisors, in which virtual machines may not be able to distinguish themselves from non-virtual machines that run only one operating system at a time and do not have a hypervisor layer between the operating system and the hardware.

Exemplary embodiments of the present invention may modify the hypervisor to define a function, for example, a hypercall, by which the virtual machines running thereon may be passed an identifier for the particular hypervisor. The space of hypervisor identifiers may be known to the virtual machine replica servers beforehand so that the identifier exported by the hypervisor upon the initiation of the hypercall may be properly understood. In this way, the virtual machine replica servers may be able to map the identifier to a hypervisor. The identifier itself may be any number or identifying information, for example, it may be an integer, an IP address, or any other tag or hash value. Then, the virtual machine replica servers may be programmed to utilize the hypercall to query the hypervisor as to the identity of the hypervisor both before starting a measurement used to assess the condition of the leader and at the end of the measurement. A comparison may then be performed between the two received identifiers. If they match then a first, relatively short, length of time may be used as a threshold to determine if the leader is performing adequately. If they do not match, then a second, relatively long, length of time may be used as the threshold. In this way, additional time may be given for the leader to respond after a failover event.

Additionally, in the event of a hardware crash and a restoration of the virtual machine replica servers from the backups, exemplary embodiments of the present invention may start the leader replica server running prior to starting the non-leader replica servers running. By ensuring that the leader activates prior to the non-leaders, the non-leaders may be better able to assess the condition of the leader because the potential problem whereby the non-leaders interpret a delay caused by the fact that the leader has started late as a failure of the leader will be avoided.

To implement this feature, exemplary embodiments of the present invention may define a function, for example, a hypercall, by which the virtual machine replica servers of the state machine replication system may provide the hypervisor with an indication as to which virtual machine replica server is the current leader. The virtual machine replica servers may be programmed to run this function, for example, every time the leader changes. In executing this function, the virtual machine replica servers may pass the hypervisor an identification number or tag signifying the current leader. This identification number or tag may be, for example, an integer, IP address, or any other tag or hash value. To distinguish between multiple instances in which the same replica serves as leader, the replica may also pass to the hypervisor the replication protocol view number, which is incremented with each leader election.

Where exemplary embodiments of the present invention are applied to state machines that are simply tolerant of benign failure, it may be sufficient that a single virtual machine replica server reports the current leader to the hypervisor. However, where applied to a state machine that is tolerant of Byzantine failure, it may be assumed that a report of a virtual machine replica server may be misleading. Accordingly, exemplary embodiments may also utilize a procedure for preventing a hypervisor from acting on an incorrect current leader identifier supplied by a Byzantine virtual machine replica server. One example of such a procedure is to program the hypervisor to examine the leader identifiers most-recently reported by the virtual machine replica servers prior to the crash of the physical machine and see if more than one virtual machine replica servers reported the same leader identifier for a single view number. For example, according to exemplary embodiments of the present invention, the hypervisor may require that there be reports of the same leader identifier received from f+1 distinct virtual machine replica servers. If one such match exists, the corresponding virtual machine replica servers may be started first. If no such match exists, the leader election may be treated as unstable and the replicas may be started in any particular order. If multiple such matches exist, the leader corresponding to the leader identifier associated with the highest view number may be started first.

During normal operation, when both physical machines 30 and 40 are running properly, both hypervisors 31 and 41 may periodically send each other messages containing the latest identifier/view number pairs reported by each virtual machine. For each replica server, the hypervisor may compare the view number in the received message to the view number it currently knows about and the hypervisor may adopt the identifier/view number pair corresponding to the highest view number as its own understanding of the current leader.

As discussed above, in the event that one physical machine fails the backups corresponding to the virtual machine replica servers of the failed physical machine are started up on the surviving physical machine. Where the optimized configuration of FIG. 3 is used, there are two possibilities for restoring the failed physical machine. Under the first possibility in which the second physical machine 40 running the four backups 46-49 is the failed server, after the failed server has been restored to operation, for example, by intervention on the part of the administrator, the failover features of the hypervisor, e.g., VMWARE FAULT TOLERANCE or REMUS HIGH AVAILABILITY, may be called upon to generate new backups 46-49 on the restored second physical machine 40.

However, under the second possibility in which the first physical machine 30 has failed and the backups 46-49 on the second physical machine 40 have assumed primary operation of the virtual machine replica servers, exemplary embodiments of the present invention may re-designate the second physical machine 40 as the primary and the failover features of the hypervisor may be used to generate new backups on the first physical machine 30 when it is back up and running. Alternatively, after the first physical machine 30 is back up and running, a live migration feature of the hypervisor may be used to transfer the running virtual machine replica servers from the second physical machine 40 to the first physical machine 30 and thereafter, the failover features of the hypervisor may be used to generate new backups on the second physical machine 40.

The live migration feature may have the ability to move a running virtual machine from one physical machine to another with minimal downtime. The virtual machine memory state may be copied from the source virtual machine to the target virtual machine in the background until the two are close enough in state that the source virtual machine may be momentarily paused. The remaining state may then be quickly transferred and then the target virtual machine may be unpaused.

Figure 4:
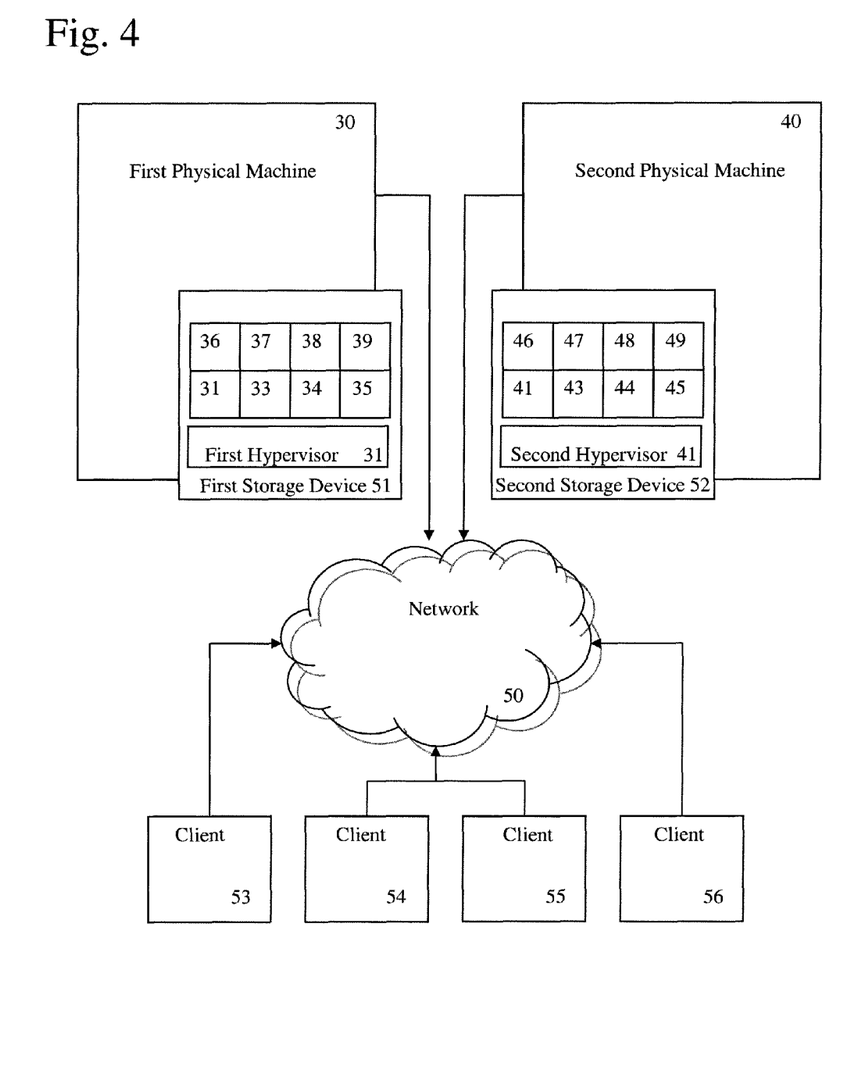
FIG. 4 is a block diagram illustrating a system having fault-tolerant replication architecture in accordance with exemplary embodiments of the present invention.

FIG. 4 is a block diagram illustrating a system having a fault-tolerant replication architecture in accordance with exemplary embodiments of the present invention. The fault tolerance may be Byzantine fault tolerance or simple benign fault tolerance. The system may include first physical machine 30 and a second physical machine 40. Both physical machines may be connected to an electronic network 50 such as the Internet. A set of one or more clients 53-56 may be connected to the network 50 and may access the first and second physical machines 30 and 40 via the network 50. Each of the first and second physical machines 30 and 40 may include a storage device 51 and 52. The first storage device 51 of the first physical machine 30 may include code for implementing a first hypervisor 31. The first storage device 51 may also include one or more installed operating systems 31-35 with corresponding one or more installed virtual machines 36-39. Similarly, the second storage device 52 of the second physical machine 40 may include code for implementing a second hypervisor 41. The second storage device 52 may also include one or more installed operating systems 41-45 with corresponding one or more installed virtual machines 46-49.

The virtual machines 36-39 of the first physical machine 30 and the virtual machines 46-49 of the second physical machine 40 may be configured to accommodate Byzantine failures such that there are a set of at least 3f+1 virtual machine replica servers, where f is a number of replica servers experiencing Byzantine failures that may be tolerated, and a set of 3f+1 virtual machine backup replica servers. Alternatively, the virtual machines 36-39 and 46-49 may be configured to simply accommodate benign failures such that there are a set of 2f-F1 virtual machine replica servers, where f is a number of replica servers experiencing benign failures that may be tolerated, and a set of 2f+1 virtual machine backup replica servers.

Each of the virtual machine replica servers (primary) has a corresponding virtual machine backup replica server (backup) and the pair of primary and backup occupy distinct physical machines such that if the primary is on the first physical machine 30 then the backup is on the second physical machine 40 and vice versa. Exemplary embodiments of the present invention are not limited to the exemplary approaches of FIGS. 1 and 2 and accordingly, the arrangement of primaries and backups between the two distinct physical machines may be changed.

Exemplary embodiments of the present invention are not bound to the use of only two physical machines each having four virtual machine replica servers running thereon. There may be more than two physical machines and there may be more than eight total virtual machine replica servers (counting both primary and backups). For example, there may be any number of virtual machine replica servers as long as there are sufficient virtual machine replica servers to accommodate the desired number of simultaneous benign or Byzantine failures. There may also be any number of physical machines.

The physical machines may be located either in a common location or in distinct locations. However, there is no requirement that a particular amount of distance be present between physical machines. For example, both machines may be located within a common rack mount. However, according to some exemplary embodiments of the present invention, distinct physical machines may be located in distinct locations.

As used herein, a physical machine may be embodied as a device that has at least one processor and is capable of executing a single un-nested hypervisor, where an un-nested hypervisor is defined as a hypervisor that does not run on another hypervisor. Distinct physical machines may therefore be defined as separate processors that are capable of each executing a separate and un-nested hypervisor at the same time. Alternatively, distinct physical machines may be defined as any two devices that are capable of booting up and processing data without the involvement of the other.

Figure 5:
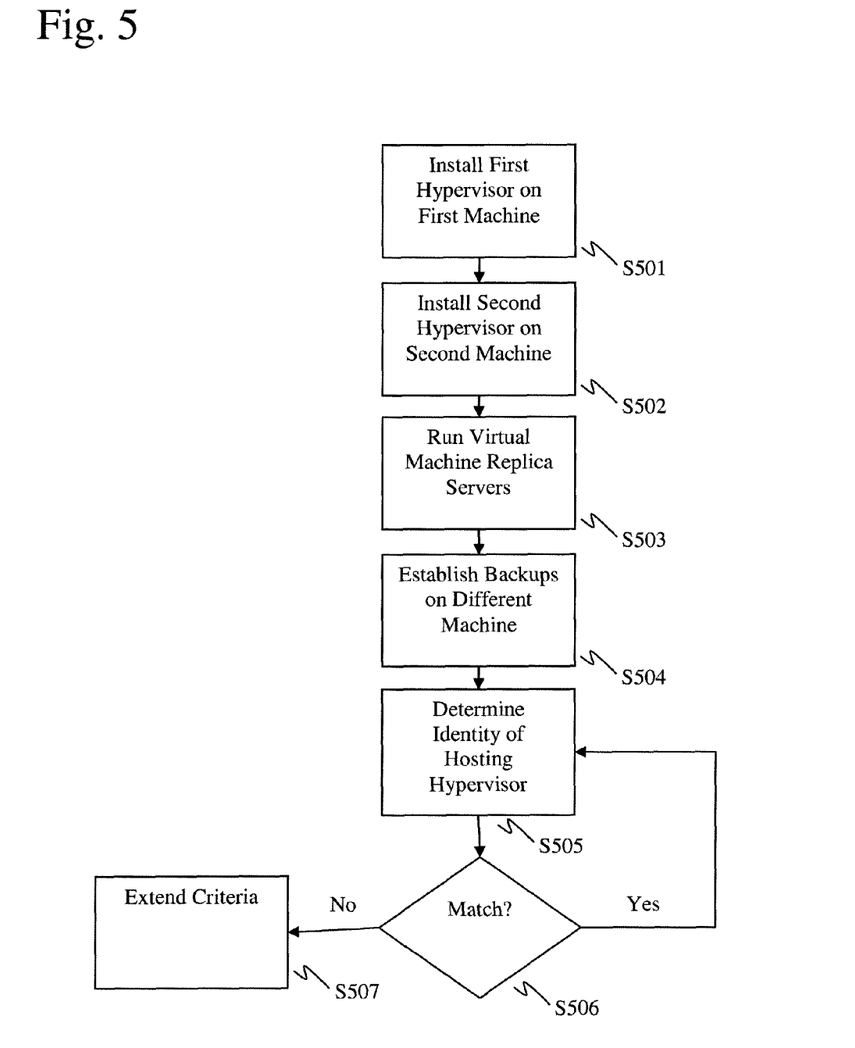
FIG. 5 is a flow chart illustrating a method for performing failover in a fault-tolerant replication system according to exemplary embodiments of the present invention.

FIG. 5 is a flow chart illustrating a method for performing failover in a fault-tolerant replication system according to exemplary embodiments of the present invention. A first hypervisor may be installed on a first machine (Step S501). As discussed above, the first machine may either be a physical machine such as a computer system or a virtual machine that itself runs on a hypervisor. A second hypervisor may be installed on a second machine (Step S502). The second hypervisor may be the same type of hypervisor as the first hypervisor, but this is not a requirement and different types of hypervisors may be used. The second machine may also be either a physical machine or a virtual machine. A set of virtual machine replica servers may be run on the first and/or second machine (Step S503). Thus some or all of the virtual machine replica servers may be run on the first or second machine. Backups of the virtual machine replica servers may then be run on the first and/or second machine (Step S504). Each backup corresponds to a particular virtual machine replica server. A given virtual machine replica server and its corresponding backup are run on different machines. Accordingly, if a given virtual machine replica server runs on the first machine then its corresponding backup runs on the second machine, and vice versa.

As discussed above, each of the virtual machine replica servers may determine whether it has been subject to a failover from an original virtual machine replica server to its corresponding backup as a result of a failure. This may be accomplished, for example, by first determining an identity of the hosting hypervisor at some point prior to a failure (Step S505). The identity may be determined, for example, as discussed above, by calling upon a hypercall designed to provide a unique identifier for each hypervisor. As this step may be repeated, it is determined whether the most recently determined identity of the hosting hypervisor matches the last identity so determined (Step S506). If there is a match (Yes, Step S506), then the identification of the hosting hypervisor may be repeated (Step S505). If, however, there is a mismatch (No, Step S507) then the criteria for assessing the performance of the leader, for example, the time allotted to the leader prior to a timeout which would trigger an election of a new leader, may be extended, for example, by a length of time approximately equal to the VRT.

Figure 6:
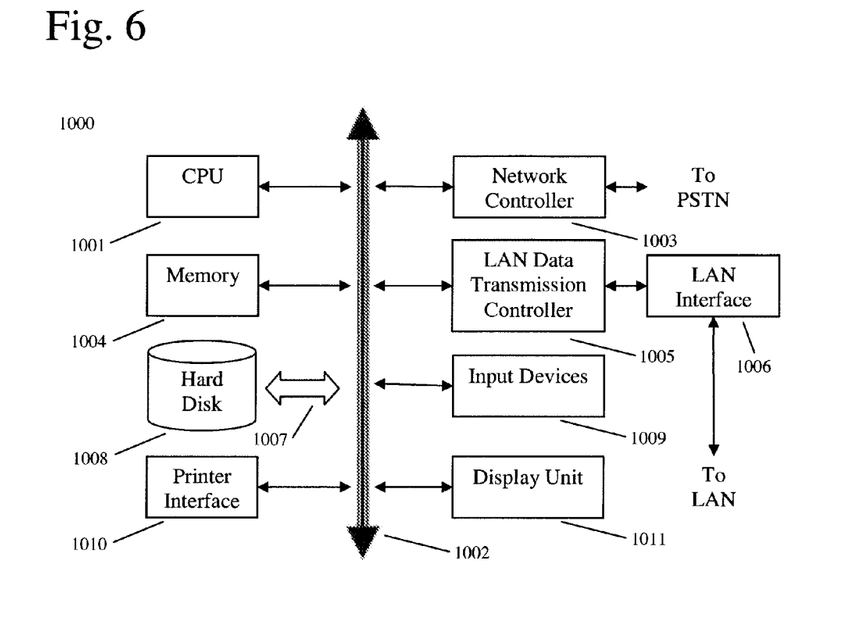
FIG. 6 shows an example of a computer system capable of implementing the method and apparatus according to embodiments of the present disclosure.

FIG. 6 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A fault-tolerant replication system, comprising:
a first machine running a first hypervisor;
a second machine that is failure-independent of the first machine, running a second hypervisor;
a first storage device within or in communication with the first machine storing code representing a first plurality of virtual machines;
a second storage device within or in communication with the second machine storing code representing a second plurality of virtual machines;
wherein each of the virtual machines of the first and second plurality of virtual machines constitutes either a virtual machine replica server of a fault-tolerant replicated state machine or a backup corresponding to a virtual machine replica server of the fault-tolerant replicated state machine and every backup is embodied on a different machine, of the first and second machines, from its corresponding virtual machine replica server,
wherein the fault-tolerant replicated state machine is a configuration in which each of the replica servers thereof vote on a single replica server thereof to act as a leader maintaining an order in which client requests sent to the state machine are to be processed.

2. The system of claim 1, wherein the first and second failure-independent machines are or are otherwise implemented on distinct physical machines.

3. The system of claim 1, wherein the first and second failure-independent machines are implemented on failure-independent virtual machines running on a common physical machine.

4. The system of claim 1, wherein the fault-tolerant replication system is a Byzantine fault-tolerant replication system.

5. The system of claim 1, wherein all of the virtual machine replica servers of the fault-tolerant replicated state machine are located on the first machine and are run by the first hypervisor and all of the backups are located on the second machine and are run by the second hypervisor.

6. The method of claim 1, wherein the virtual machine replica servers of the fault-tolerant replicated state machine comprise a first subgroup of one or more virtual machine replica servers and a second subgroup of virtual machine replica servers having a corresponding first subgroup of backups and a second subgroup of backups, wherein:
all of the virtual machine replica servers of the first subgroup are located on the first machine and are run by the first hypervisor and all of the backups of the first subgroup are located on the second machine and are run by the second hypervisor, and all of the virtual machine replica servers of the second subgroup are located on the second machine and are run by the second hypervisor and all of the backups of the second subgroup are located on the first machine and are run by the first hypervisor.

7. The system of claim 1, wherein each backup corresponding to a virtual machine replica server of the fault-tolerant replicated state machine is a failover virtual machine for its corresponding virtual machine replica server.

8. The system of claim 1, wherein the fault-tolerant replicated state machine provides a service which is accessible by one or more clients over an electronic network.

9. The system of claim 8, wherein the electronic network is the Internet.

10. The system of claim 1, wherein the first hypervisor includes a function for permitting one of the virtual machines of the first plurality of virtual machines to determine a unique identifier associated with the first hypervisor and the second hypervisor includes a function for permitting one of the virtual machines of the second plurality of virtual machines to determine a unique identifier associated with the second hypervisor.

11. The system of claim 1, wherein the first and second hypervisors each include a function for permitting one of the virtual machine replica servers to inform the respective hypervisor of a current leader among the virtual machine replica servers of the fault-tolerant replicated state machine.

12. The system of claim 1, wherein the first and second hypervisors each include a function for permitting one of the virtual machine replica servers to inform the respective hypervisor of a virtual machine among the virtual machine replica servers of the fault-tolerant replicated state machine that is to be restarted first after recovery from a failure of either the first or second machines.

13. A method for providing a fault-tolerant replication system, comprising:
installing a first hypervisor on a first machine;
installing a second hypervisor on a second machine, that is failure-independent of the first machine;
running a first plurality of virtual machine replica servers on the first hypervisor of the first machine and running a second plurality of virtual machine replica servers on the second hypervisor of the second machine,
wherein the plurality of virtual machine replica servers comprise a fault-tolerant replicated state machine;
establishing a first plurality of backup virtual machines, corresponding to the first plurality of virtual machine replica servers of the first machine, on the second machine, and establishing a second plurality of backup virtual machines, corresponding to the second plurality of virtual machine replica servers of the second machine, on the first machine.

14. The method of claim 13, wherein the first and second failure-independent machines are or are otherwise implemented on distinct physical machines.

15. The method of claim 13, wherein the first and second failure-independent machines are implemented on failure-independent virtual machines running on a common physical machine.

16. The method of claim 13, wherein the fault-tolerant replication system is a Byzantine fault-tolerant replication system.

17. The method of claim 13, wherein each backup corresponding to a virtual machine replica server is a failover virtual machine for its corresponding virtual machine replica server.

18. The method of claim 13, wherein when one of the first and second machines fails, all of the backups established on the surviving machine assume the function of their corresponding virtual machine replica servers that were running on the failed machine.

19. The method of claim 13, wherein a particular virtual machine replica server of the plurality of virtual machine replica servers determines an identity of the hypervisor it is running on.

20. The method of claim 19, wherein after the identified machine fails and a particular backup corresponding to the particular virtual machine replica server assumes a function of the particular virtual machine replica server, the particular backup:
 determines an identity of the hypervisor it is running on;
 determines that the identified machine has failed based on a mismatch between the identity of the hypervisor determined by the particular virtual machine replica server and the identity of the hypervisor determined by the backup; and
 extends criteria for determining a failure of a virtual machine replica server based on the determination that the identified machine has failed.

21. The method of claim 13, wherein one or more of the virtual machine replica servers of the first and second plurality of virtual machine replica servers informs their respective hypervisors of an identity of a current leader among the plurality of virtual machine replica servers.

22. The method of claim 21, wherein after a machine of the first and second machines fails and backups corresponding to the virtual machine replica servers that were running on the failed machine assume operation of their respective virtual machine replica servers, a backup of the backups corresponding to the virtual machine replica servers that were running on the failed machine corresponding with a virtual machine replica server that was identified as the current leader is started before the remainder of backups.

23. A Byzantine fault-tolerant replication system, comprising:
 a first physical machine running a first hypervisor;
 a second physical machine, distinct from the first physical machine, running a second hypervisor;
 a first plurality of virtual machine replica servers of a Byzantine fault-tolerant replicated state machine running on the first hypervisor;
 a first plurality of virtual machine backups running on the second hypervisor, each of the first plurality of virtual machine backups corresponding to one of the virtual machine replica servers of the first plurality of virtual machine replica servers running on the first hypervisor;
 a second plurality of virtual machine replica servers of the Byzantine fault-tolerant replicated state machine running on the second hypervisor; and
 a second plurality of virtual machine backups running on the first hypervisor, each of the second plurality of virtual machine backups corresponding to one of the virtual machine replica servers of the second plurality of virtual machine replica servers running on the second hypervisor.

* * * * *